US010239719B2

United States Patent
Castells De Monet et al.

(10) Patent No.: US 10,239,719 B2
(45) Date of Patent: *Mar. 26, 2019

(54) SPINDLE

(71) Applicant: HEWLETT-PACKARD DEVELOPMENT COMPANY, L.P., Houston, TX (US)

(72) Inventors: Raimon Castells De Monet, Barcelona (ES); Jose Antonio Alvarez Tapia, Sant Cugat del Valles (ES); David Claramunt Morera, Sant Esteve Sesrovires (ES)

(73) Assignee: Hewlett-Packard Development Company, L.P., Spring, TX (US)

( * ) Notice: Subject to any disclaimer, the term of this patent is extended or adjusted under 35 U.S.C. 154(b) by 278 days.

This patent is subject to a terminal disclaimer.

(21) Appl. No.: 15/185,607

(22) Filed: Jun. 17, 2016

(65) Prior Publication Data

US 2016/0297637 A1 Oct. 13, 2016

Related U.S. Application Data

(63) Continuation of application No. 13/979,070, filed as application No. PCT/US2011/021159 on Jan. 13, 2011, now Pat. No. 9,403,652.

(51) Int. Cl.
| | |
|---|---|
| *B65H 18/06* | (2006.01) |
| *B65H 75/30* | (2006.01) |
| *B65H 16/06* | (2006.01) |
| *B65H 16/02* | (2006.01) |
| *B65H 18/10* | (2006.01) |
| *F16H 13/08* | (2006.01) |

(52) U.S. Cl.
CPC ........... *B65H 16/06* (2013.01); *B65H 16/021* (2013.01); *B65H 18/06* (2013.01); *B65H 18/106* (2013.01); *B65H 75/30* (2013.01); *F16H 13/08* (2013.01); *B65H 2403/483* (2013.01)

(58) Field of Classification Search
CPC .... B65H 16/06; B65H 16/021; B65H 18/106; B65H 75/30; B65H 2403/483; B65H 2404/13211; F16H 13/08
See application file for complete search history.

(56) References Cited

U.S. PATENT DOCUMENTS

| | | |
|---|---|---|
| 2,012,208 A | 8/1935 | Wildy |
| 2,542,917 A | 2/1951 | Fischer et al. |
| 2,890,002 A | 6/1959 | Thomas |
| 3,297,273 A | 1/1967 | Ippolito |
| 3,522,903 A | 8/1970 | Lloyd |
| 4,382,704 A * | 5/1983 | Hendrischk ............ B65H 20/02 400/585 |
| 4,395,152 A * | 7/1983 | Hendrischk .............. B41J 11/04 400/569 |

(Continued)

FOREIGN PATENT DOCUMENTS

| | | |
|---|---|---|
| CN | 1230472 | 10/1999 |
| CN | 1956887 A | 5/2007 |

(Continued)

*Primary Examiner* — Michael R Mansen
*Assistant Examiner* — Nathaniel L Adams
(74) *Attorney, Agent, or Firm* — HP Inc. Patent Department

(57) ABSTRACT

In one embodiment, a roll spindle comprises two roll supports and a differential.

14 Claims, 5 Drawing Sheets

(56) References Cited

U.S. PATENT DOCUMENTS

| | | |
|---|---|---|
| 4,415,125 A | 11/1983 | Schwengeler |
| 4,695,000 A | 9/1987 | Fretz et al. |
| 4,984,914 A | 1/1991 | Hayakawa |
| 5,085,532 A | 2/1992 | Surya et al. |
| 5,203,232 A | 4/1993 | Ito et al. |
| 5,278,624 A | 1/1994 | Kamprath et al. |
| 5,441,207 A | 8/1995 | Bock et al. |
| 5,960,646 A | 10/1999 | Bodelshausen |
| 6,280,371 B1 | 8/2001 | Krippelz |
| 6,283,402 B1 | 9/2001 | Fordham |
| 6,398,360 B1 | 6/2002 | Brewington et al. |
| 2004/0110616 A1 | 6/2004 | Katsuhara et al. |
| 2007/0210201 A1 | 9/2007 | Palumbo |

FOREIGN PATENT DOCUMENTS

| | | |
|---|---|---|
| CN | 201012868 Y | 1/2008 |
| CN | 201660338 U | 12/2010 |
| DE | 3616406 A1 | 2/1988 |
| EP | 0230943 A1 | 8/1987 |
| EP | 0573953 A2 | 12/1993 |
| JP | 0671842 A | 3/1994 |
| JP | 06-293469 A | 10/1994 |
| JP | H0885651 A | 4/1996 |
| JP | 09-058616 A | 3/1997 |
| JP | 11-165437 | 6/1999 |
| JP | 2004-161494 A | 6/2004 |
| KR | 10-2007-0003852 A | 1/2007 |
| TW | I334848 B | 12/2010 |

\* cited by examiner

SPINDLE

BACKGROUND

Spindles are used to wind and unwind rolls. A drive may drive the spindle for winding and unwinding the rolls for transporting a roll material through a processing system. In many instances, the processing system is provided with the drive for rotating the spindle. A known example of a roll processing system is a printer. It can be efficient to use a single spindle for rotating multiple rolls.

BRIEF DESCRIPTION OF THE DRAWINGS

For the purpose of illustration, certain embodiments of the present invention will now be described with reference to the accompanying diagrammatic drawings, in which.

DETAILED DESCRIPTION

In the following detailed description, reference is made to the accompanying drawings. The embodiments in the description and drawings should be considered illustrative and are not to be considered as limiting to the specific embodiment or element described. Multiple embodiments may be derived from the following description and/or drawings through modification, combination or variation of certain elements. Furthermore, it may be understood that other embodiments or elements that are not literally disclosed may be derived from the description and drawings by a person skilled in the art.

Figure 1:
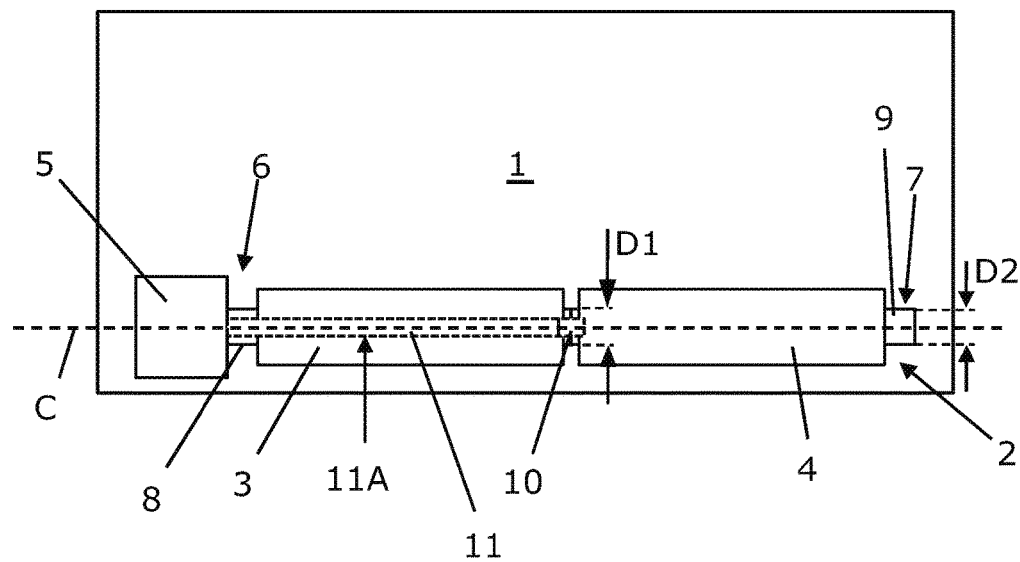
FIG. 1 shows a diagram of an embodiment of a spindle that is mounted on a roll processing apparatus wherein the spindle supports two rolls.

FIG. 1 shows a system 1 comprising a spindle 2. The spindle 2 is arranged to support one or multiple rolls 3. In the drawing, the spindle 2 supports two rolls 3, 4. The system 1 comprises a drive 5 for driving the spindle 2. The drive 5 engages the spindle at at least one of its end portions 6, 7. The drive 5 is arranged to rotate the spindle 2 for winding and/or unwinding the rolls 3, 4, about an axis of rotation C. Winding and/or unwinding the rolls 3, 4 causes the roll material to advance through the system 1. In one embodiment, the system 1 comprises a printing system, for example a large format printing system. The rolls 3, 4 may comprise rolls of print media The spindle 2 is arranged to simultaneously rotate two rolls 3, 4. In an embodiment, the spindle 2 comprises two support tubes 8, 9 extending along the axis C of rotation of the spindle 2. In other embodiments, the spindle 2 may comprise other types of supports for engaging and supporting the rolls 3, 4, such as feet or rings that rotate around said axis of rotation C.

Figure 3:
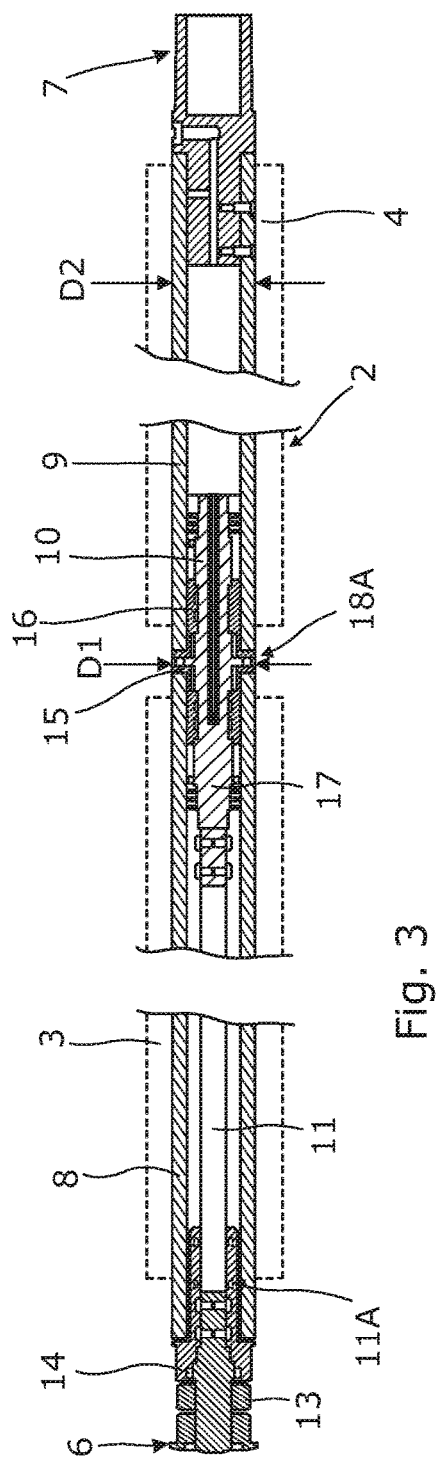
FIG. 3 shows a cross sectional front view of an embodiment of a spindle.

The spindle 2 comprises a differential 10. The differential 10 may extend approximately in the middle of the spindle 2. The differential 10 has two outputs 15, 16 and one input 17, as shown in FIG. 3. Each differential output 15, 16 is connected to a support tube 8, 9 to rotate the respective support tube 8, 9. Each tube 8, 9 may support a respective roll 3, 4.

The spindle 2 comprises a drive transmission 11A for transmitting a drive movement from the drive 5 to the differential 10. In use, the drive transmission 11A engages the drive 5. The differential 10 and the drive transmission 11A are indicated in dashed lines. In the shown embodiment, the drive transmission 11A comprises a transmission shaft 11 within one of the tubes 8, extending from an end portion 6 of the spindle 2 to the differential 10. The drive transmission 11A may further comprise a gear 13 for transmitting movement from the external drive 5 to the transmission shaft 11, as shown in FIG. 3.

In use, the drive 5 rotates the drive transmission 11A. The drive transmission 11A rotates the differential 10. The differential 10 equally distributes the incoming torque to each of the tubes 8, 9, so that both rolls 3, 4 may simultaneously wind or unwind at equal media tension, independent of whether the diameters of the rolls 3, 4 are equal or not, or of whether one of the rolls 3, 4 has ended. In an embodiment, approximately half of the drive torque is transmitted to a first support tube 8, and approximately half of the drive torque is transmitted to a second support tube 9. Equalizing the distribution may maintain the roll material tension of both rolls 3, 4, even when they are of different diameters. Equalizing the output torque may reduce roll material wrinkle, even when multiple rolls 3, 4 are used.

In an embodiment, the outer dimension D1 of the differential is equal to or less than the outer dimension D2 of the support tubes 8, 9, as shown in FIGS. 1 and 3. If the differential does not protrude from the outer dimension D2 of the support tubes 8, 9 this allows that a roll 3 slides over the differential 10 with little or no disruption, allowing relatively easy mounting of one or more rolls 3, 4.

Figure 2:
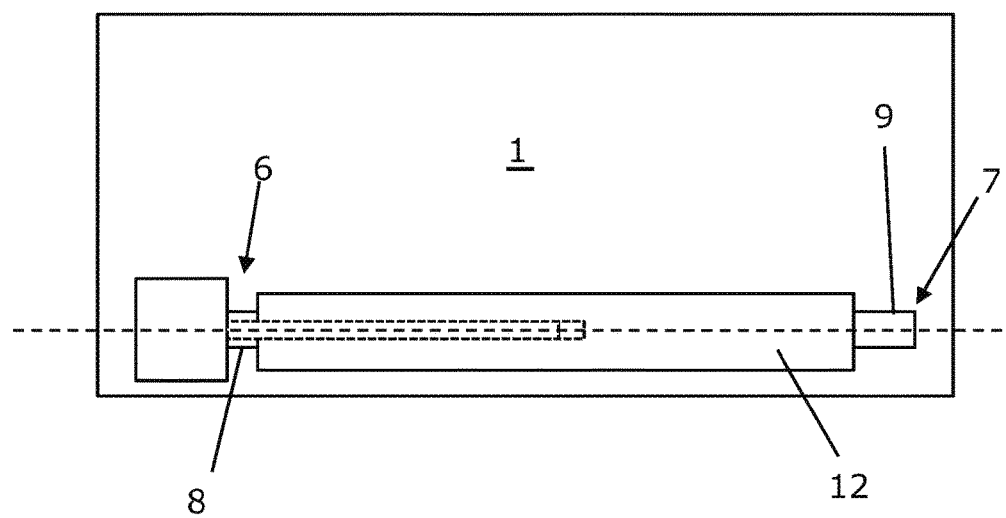
FIG. 2 shows a diagram of an embodiment of a spindle that is mounted on a roll processing apparatus wherein the spindle supports a single roll.

FIG. 2 shows an embodiment of the system 1 with the same spindle 2 as in FIG. 1, except for the fact that only one roll 12 is mounted onto the spindle 2. The roll 12 extends, and is supported by, both support tubes 8, 9. The roll 12 of FIG. 2 is longer than approximately half of the spindle 2. The roll 12 is longer than one support tube 8 or 9. The spindle 2 may have only one rotation speed along its full length, as with most conventional spindles 2, to properly rotate one roll 12. Also when the spindle 2 supports a single roll that is shorter than half of the spindle 2, a single rotation speed may be applied.

In an embodiment, the outer surface of the spindle 2 is free of protrusions, at least between its two end portions 6, 7, for being able to support one roll (FIG. 2) or more rolls (FIG. 1) along its full length, without having to assemble or disassemble parts of the spindle 2. For example, the differential 10 may have approximately the same outer diameter as the tubes 8, 9, or the differential 10 may have a smaller diameter than the tubes 8, 9.

FIG. 3 shows a more detailed, cross sectional view of an embodiment of the spindle 2. Note that for means of illustration, mounted rolls 3, 4 are illustrated in dashed lines. One end portion 6 of the spindle 2 comprises a drive engagement portion so as to receive a drive movement from an external drive 5. The drive engagement portion may comprise a gear 13. The gear 13 is connected to the transmission shaft 11. The transmission shaft 11 extends from the gear 13 to the differential 10.

The two support tubes 8, 9 may be referred to as a first and a second support tube 8, 9, respectively. The first support tube 8 is supported by a bearing 14 at one end and by a first differential output 15 at the other end. The bearing 14 is mounted onto the transmission shaft 11. The bearing 14 is arranged to allow rotation of the first tube 8 with respect to the transmission shaft 11.

The second support tube 9 is supported by a second differential output 16 at one end and the other end may form the respective end portion 7 of the spindle. Said end portion 7 of both the spindle 2 and the second support tube 7 is arranged to engage a spindle support of the system 1, opposite to the system drive 5.

Figure 4:
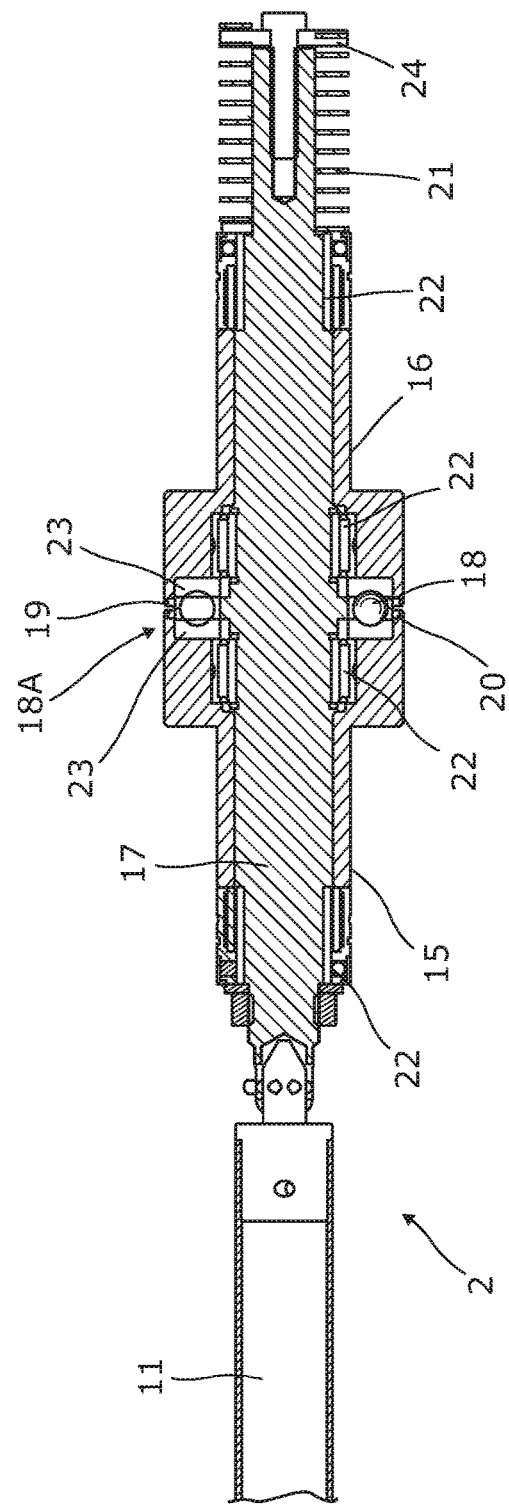
FIG. 4 shows a detailed cross sectional front view of an embodiment of a differential and a transmission shaft of a spindle.
Figure 5:
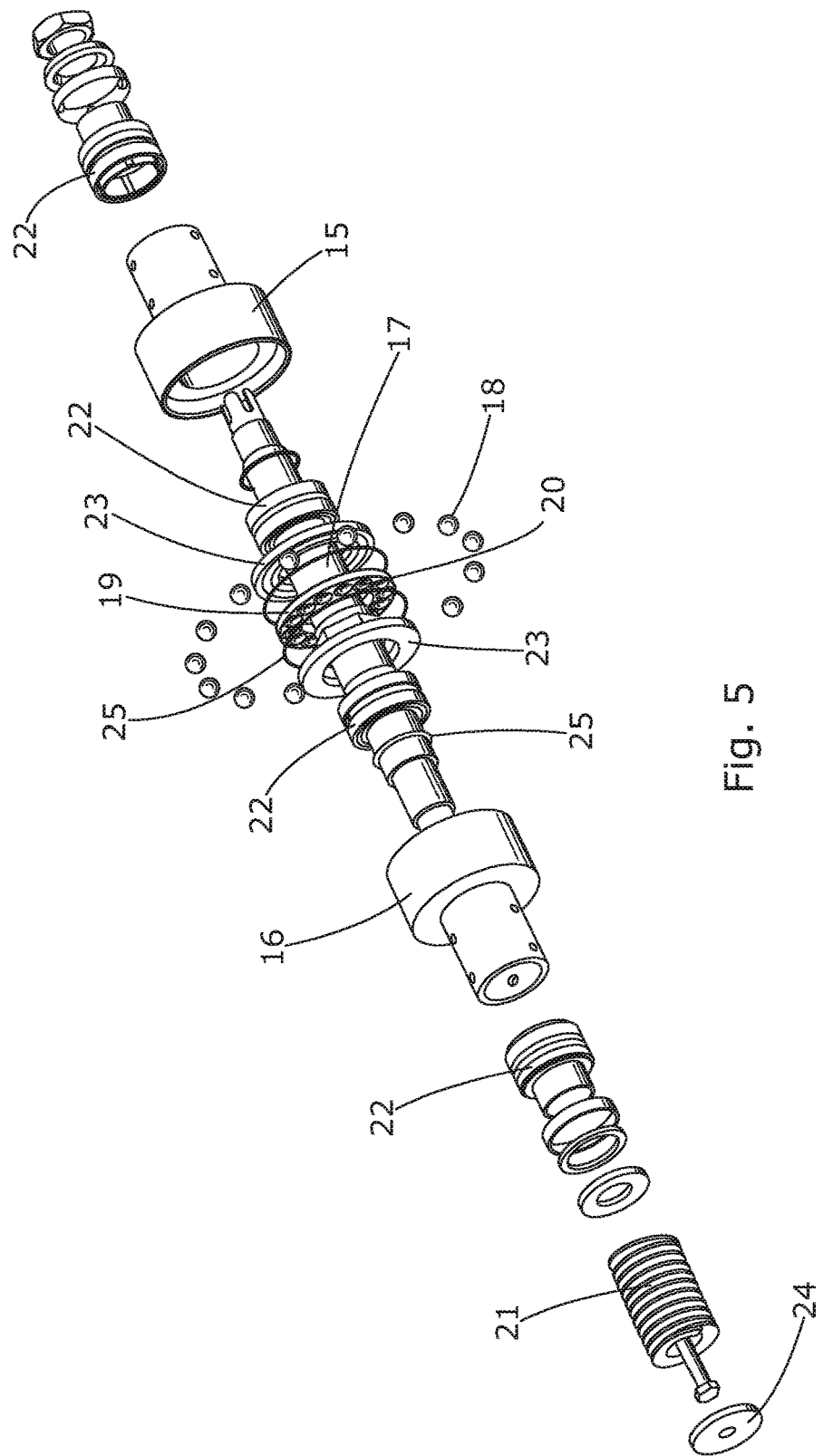
FIG. 5 shows an exploded perspective view of an embodiment of the differential shown in FIG. 4.

FIG. 4 shows an embodiment of the differential 10 and a part of the transmission shaft 11 in cross sectional front view. FIG. 5 shows an exploded view of an embodiment of the differential 10. As can be seen from FIGS. 4 and 5, the differential 10 may comprise a ball differential. The differential 10 comprises a differential input 17 and two outputs 15, 16. The differential input 17 is connected to the transmission shaft 11. In use the differential input 17 is rotated. The differential 10 further comprises a transmission portion 18A for transmitting the rotation of the input 17 to the outputs 15, 16.

In the shown embodiment, the transmission portion 18A comprises a ball bearing. In an embodiment, the ball bearing comprises balls 18 and a wheel 19 containing ball bearing cups 20. The balls 18 sit in the cups 20. The surfaces of the balls 18 extend outside of the wheel 19 on both sides of the wheel 19 for engaging the respective differential outputs 15, 16. In the shown embodiments, the outputs 15, 16 are provided with washers 23 that engage the balls 18. The washers 23 may be fitted in the outputs 15, 16. To rotate with respect to the differential input 17 and the transmission shaft 11 the outputs 15, 16 may be supported by further bearings 22, for example mounted on the differential input 17 or the transmission shaft 11.

The differential outputs 15, 16 may be pressed against the transmission portion 18A by a resilient element such as a helical spring 21 so as to have enough friction between the outputs 15, 16 and the transmission portion, for example to prevent slippage. In the shown embodiment, the spring 21 may prevent slippage between the outputs 15, 16 and the balls 18. The spring 21 may be biased against a foot 24 of the differential input 17. Further bearings may be provided between the spring 21 and the respective output 16 to allow rotation of the spring 21 with respect to the output 16. Further parts of the differential 10 may include seal rings 25, further washers and/or fittings, as can be seen from FIG. 5.

In a situation where two rolls 3, 4 are properly mounted on the respective tubes 8, 9, and both tubes 8, 9 undergo a torque related to winding or unwinding the rolls 3, 4, both the outputs 15, 16 will be driven by the differential input 17 through the balls 18. The balls 18 may adjust the rotational speed of the outputs 15, 16 with respect to each other so that both outputs 15, 16 undergo an equal torque.

In an embodiment of a system for winding or unwinding media from media rolls, a torque on each roll is dependent of the tension in the unwound part of the media. In such embodiment, the torque on the output 15, 16 may be a function of the media tension and vice versa. Since the torques of the outputs 15, 16 are inherently equal due to the characteristics of the differential 10, the tension in the media is equal for both rolls 3, 4 when rotating the spindle 2. The rotational speed of the two tubes 8, 9 that support rolls 3, 4 of different diameters is automatically adjusted, to the end of providing an equal linear media advance speed of the media of both rolls 3, 4.

Figure 6A:
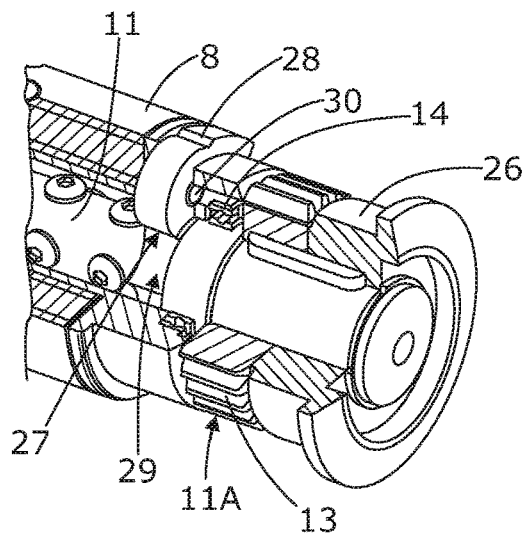
FIG. 6A shows a cross sectional perspective view of an embodiment of a spindle end portion with a blocking arrangement in a blocking position.

FIG. 6A shows a detailed, partly cross sectional, perspective view of an embodiment of the spindle 2 near the first end portion 6. The first end portion 6 comprises a support portion 26 that in use is supported by a spindle support of the system 1. The first end portion 26 comprises a gear 13 that in use is engaged by the system drive 5. The gear 13 is connected to the transmission shaft 11. The support tube 8 is supported by bearings 14 that are supported by the transmission shaft 11.

The embodiment shown in FIG. 6A comprises a blocking arrangement 27. The blocking arrangement 27 is arranged to block the support tubes 8, 9 with respect to each other so that the surface of the spindle 2 has a single rotational speed when rotated by the drive 5. This may be advantageous when mounting rolls 3, 4 onto the spindle 2, or when mounting and rotating just one roll 12 (FIG. 2). It may allow to continue processing one roll 3 when the other one 4 of the two mounted rolls 3, 4 has ended.

The blocking arrangement 27 may be arranged to block one of the support tubes 8, 9 with respect to the drive transmission 11A. In the shown embodiment, the blocking arrangement 27 is arranged to block the first support tube 8 with respect to the transmission shaft 11. This blocks the balls 18 with respect to the respective outputs 15, and the friction between the balls 18 and the second output 16 prevents the second output 16 from rotating with respect to the first output 15. Since both outputs 15, 16 are blocked with respect to each other, both tubes 8, 9 are also blocked with respect to each other.

In the shown embodiment, the blocking arrangement 27 extends near and/or in the end portion 6 of the spindle 2. The blocking arrangement 27 may comprise a latch 28. In the shown embodiment, the latch 28 is connected to the support tube 8, and is arranged to be moved between a blocking position and a released position. In the shown embodiment, the latch 28 is connected to the support tube 8 by a hinge 30, for hinging with respect to the support tube 8. The latch 28 can be actuated near the end portion 6, so that the spindle 2 can be blocked even when rolls 3, 4 are mounted.

Figure 6B:
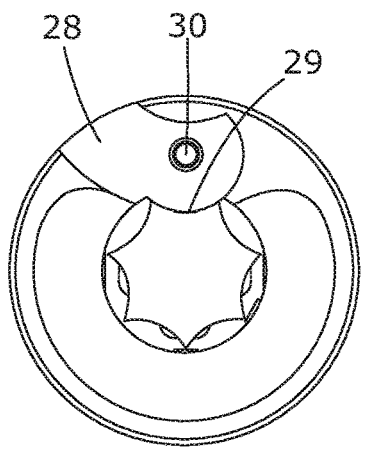
FIG. 6B shows a cross sectional side view of the embodiment of the spindle end portion and blocking arrangement of FIG. 6A in a blocking position.
Figure 6C:
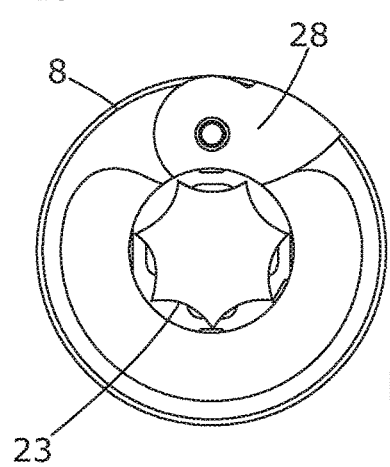
FIG. 6C shows a cross sectional side view of the embodiment of the spindle end portion and blocking arrangement of FIGS. 6A and 6B in a released position.

In a blocking position, the latch 28 engages the drive transmission 11A, as can be seen from FIG. 6B. In a released position the latch 28 releases the drive transmission 11A, as can be seen from FIG. 6C. In an embodiment, the blocking arrangement 27 extends within the outside dimensions of the support tubes 8, 9.

The latch 28 may lock and unlock, respectively, the support tube 8 with respect to the drive transmission 11A. The drive transmission 11A may comprise one or more notches or slots 29 for receiving the latch 28 in a blocking position. In the shown embodiment, the slots 29 or notches are provided around the transmission shaft 11 to allow the latch 28 to block in multiple positions of the latch 28 with respect to transmission shaft 11. Furthermore, the latch 28 is arranged so that it does not extend outside of the circumference of the tube 8 in both a blocking and a released position, as can be seen from FIGS. 6B and 6C. This allows for usage of substantially the full length of the spindle 2.

Figure 7:
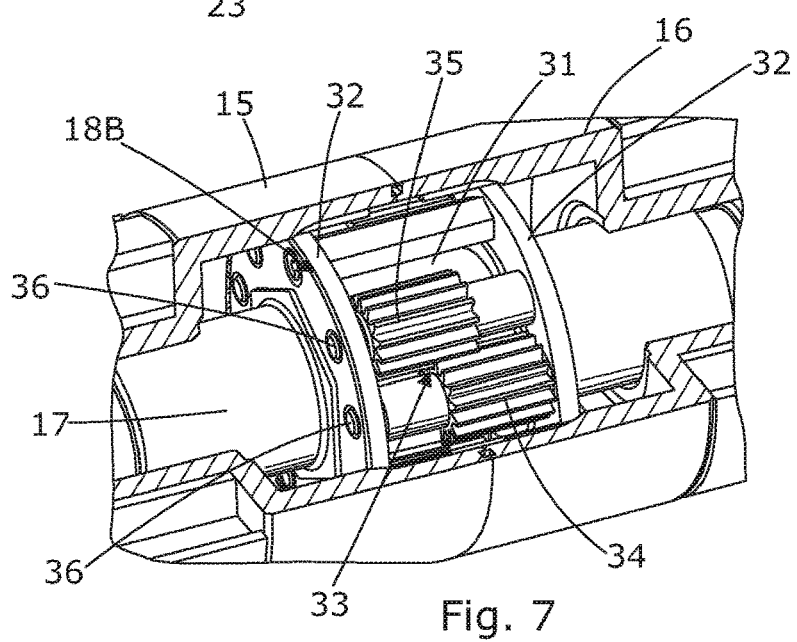
FIG. 7 shows a detailed cross sectional perspective view of another embodiment of a differential in a spindle.

In FIG. 7 another embodiment of a differential 10A is shown. The transmission portion 18B may comprise a wheel 31 connected to the differential input 17. The wheel 31 comprises flanges 32, between which gear couples 33 are provided. The gear couples 33 comprise two inter-engaging gears 34, 35. When the wheel 31 rotates the gear couples 33 rotate together with the wheel 31 around the rotation axis C of the spindle 2, while each gear 34, 35 may rotate around its own axle 36. The gears 34, 35 inter-engage. Each of the gears 34, 35 may engage a respective toothed inner part of the respective output 15, 16 so that the outputs are rotated with respect to each other when the gears 34, 35 rotate round their own axles 36.

In further embodiments other types of differentials or similar actuators may be suitable. For example, such differentials may comprise an electrical, a mechanical, or a magnetic transmission portion, or any other transmission portion that equally distributes an incoming torque over multiple outputs 15, 16. The differential may comprise magnetic gears, and/or friction gears and/or other suitable transmission mechanisms for distributing an input torque over multiple outputs 15, 16. Also, different embodiments of drive transmissions 11A or blocking arrangements 27 are suitable. For example, the drive transmission 11A may comprise a servo-control, or electrical transmission. For example, the blocking arrangement 27 may comprise an electrically controlled, and/or servo-controlled mechanism.

Figure 8:
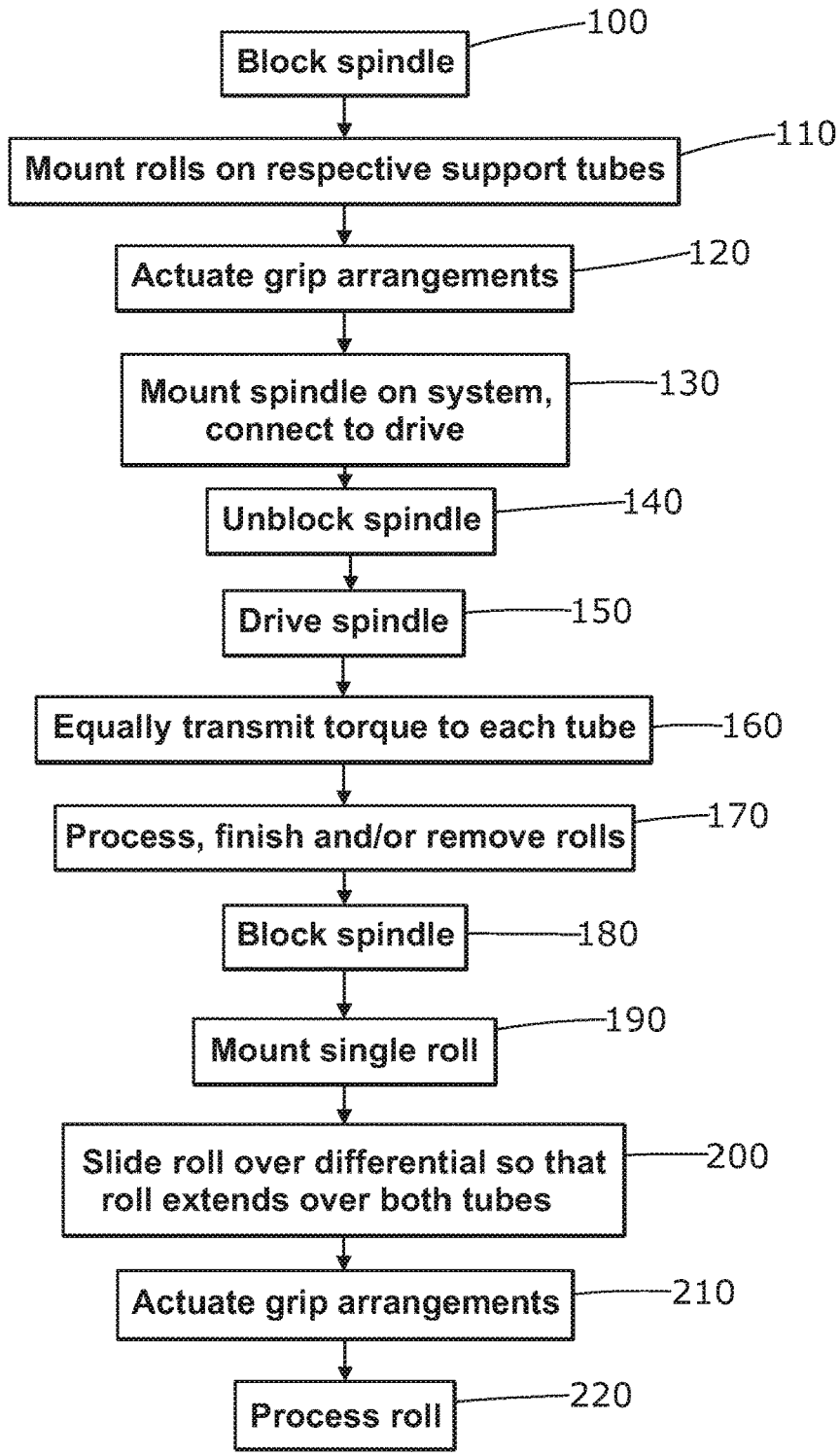
FIG. 8 shows a flow chart of an embodiment of a method of processing rolls.

FIG. 8 shows a flow chart of an embodiment of a method of processing rolls 3, 4, 12. In a first step 100, the spindle 2 is blocked by actuating the blocking arrangement 27. The support tubes 8, 9 may be blocked from movement with respect to each other. In an embodiment, the support tubes 8, 9 are blocked with respect to each other by blocking one support tube 8 with respect to the drive transmission 11A near the respective end portion 6.

In a next step 110, the rolls 3, 4 may be mounted onto the respective support tubes 8, 9. A relatively easy mounting of the rolls 3, 4 may be facilitated by blocking rotation of the tubes 8, 9 with respect to each other, as done in step 100. The rolls 3, 4 may be slit over the spindle 2 until both are in a correct position on the respective support tubes 8, 9. The rolls 3, 4 may be slit over one end portion 6 or 7. For example, one roll 3 or 4 is slit over the differential 10.

In a further step 120, a grip arrangement may be actuated for gripping the rolls 3, 4, to prevent slipping of the rolls 3, 4 with respect to the tubes 8, 9. In one embodiment, the actuation mechanism of such grip arrangement may extend through the differential 10 to be able to centrally actuate the grip arrangement in both tubes. 8, 9

In a next step 130, the spindle 2 with the rolls 3, 4 is mounted onto the system 1. The system 1 may be provided with spindle supports. In a supported condition the drive transmission 11A of the spindle 2 may engage the system drive 5. In an embodiment, the drive 5 of the system 1 engages a gear 13 of the drive transmission 11A of the spindle 2. In a further step 140, the spindle 2 is unblocked so that the support tubes 8, 9 are allowed to rotate with respect to each other.

In a further step 150, the spindle 2 is rotated. In an embodiment, the drive transmission 11A is driven, which in turn drives the differential 10. The differential 10 simultaneously drives both support tubes 8, 9 so that each support tube 8, 9 undergoes an equal torque, as indicated by step 160.

While driving the support tubes 8, 9 the rolls 3, 4 are processed, as indicated by step 170. In one embodiment, the media from the rolls is advanced and printed. Unwound roll material may be finished, cut, stacked, folded, etc. After having at least partly processed the rolls 3, 4, the left over parts may be removed from the spindle 2. Therefore, the spindle 2 may be blocked again, as indicated by step 180, to readily remove the rolls 3, 4 from the spindle 2. Steps 100-170 may be repeated.

In an embodiment, the rolls 3, 4 are mounted onto the pre-assembled spindle 2, so that each roll is supported by a separate support tube 8, 9. Thereafter each support tube 8, 9 is driven with equal torque, through the differential 10, wherein the differential 10 has an outer dimension that is approximately equal to or smaller than the outer dimension D2 of the support tubes 8, 9.

In an embodiment, it may be desired to use the same spindle 2 for processing one single roll 12. Such roll 12 may be longer than one of the tubes 8, 9. Continuing with step 180, the spindle 2 is blocked before mounting the single roll 12 onto the spindle 2. After blocking, the single roll 12 is mounted onto the spindle, as indicated by step 190. In step 200, the single roll 12 is slit over the differential 10 to put it in position so that it partly extends over both support tubes 8, 9. The tubes 8, 9 remain blocked. In step 210, the grip arrangement may be actuated to secure the roll 12 to the support tubes 8, 9. In a further step 220 the roll 12 may be processed.

In an embodiment, the method and spindle allow repetitive mounting of the rolls 3, 4 onto a pre-assembled spindle 2 so that the roll 3, 4 are each supported by a support tube 8, 9. In between mounting different rolls 3, 4, the spindle 2 does not need to be disassembled or re-assembled and no additional components are needed. The fact that the differential 10 is adapted to have an equal or smaller outer dimension D1 than the outer dimension D2 of the support tubes 8, 9 allows for one or multiple rolls 3, 4, 12 of different lengths to be readily exchanged and positioned onto the spindle 2. Moreover, the spindle 2 may perform its function on different systems 1, for example conventional systems, for example printing systems, without needing to adapt the respective system 1.

In an embodiment, the spindle 2 may be provided in the form of a kit of parts for building the spindle 2. Such kit may comprise at least two support tubes 8, 9 of approximately equal outer dimensions D2, and a differential 10 arranged to engage the support tubes 8, 9 for transmitting an equal torque to each of the tubes 8, 9, having an outer dimension D1 that is approximately equal to or smaller than the outer dimensions D2 of the support tubes 8, 9. Further parts may include a transmission drive 11A, a blocking arrangement 27, etc.

Certain embodiments of the spindle 2 allow mounting of one or more rolls 3, 4, 12 along substantially the full length of the spindle 2. In one embodiment, the spindle 2 has a length of at least approximately 3 meter and is arranged to drive at least two rolls of at least approximately 1.50 meters with equal torque and/or equal roll material advance speed. In an embodiment, there may be a small gap between two rolls 3, 4 top prevent roll material overlap. In the shown embodiments, the differential 10 is placed approximately in the middle of the spindle 2 and the support tubes 8, 9 have approximately the same size. In other embodiments, the support tubes 8, 9 may have different sizes.

When mounting two rolls onto the spindle 2 in a printing system, the spindle 2 may provide for different angular speeds of the tubes 8, 9 for maintaining the same linear advance speeds of the respective media.

The above description is not intended to be exhaustive or to limit the invention to the embodiments disclosed. Other variations to the disclosed embodiments can be understood and effected by those skilled in the art in practicing the claimed invention, from a study of the drawings, the disclosure, and the appended claims. The indefinite article "a" or "an" does not exclude a plurality, while a reference to a certain number of elements does not exclude the possibility of having more elements. A single unit may fulfil the functions of several items recited in the disclosure, and vice versa several items may fulfil the function of one unit.

In the following claims, the mere fact that certain measures are recited in mutually different dependent claims does not indicate that a combination of these measures cannot be used to advantage. Multiple alternatives, equivalents, variations and combinations may be made without departing from the scope of the invention.

What is claimed is:

1. Roll spindle, comprising
    an axis of rotation,
    two roll supports extending along the axis of rotation, and
    a differential arranged to distribute a torque to each of the supports, wherein an outer dimension of the differential is equal to or less than an outer dimension of the supports so that a roll can slide over the differential; and
    a blocking arrangement arranged to block the supports from rotating with respect to each other so that both have equal rotational speed when the spindle is rotated by an external drive.

2. Roll spindle according to claim 1, wherein the differential is arranged in a middle portion of the roll spindle between the two roll supports.

3. Roll spindle according to claim 1, wherein the two roll supports are sized to allow one single roll to be slipped onto the spindle from either end, with the single roll then being supported with a first part of the single roll on a first of the roll supports and a second part of the single roll on a second of the roll supports.

4. Roll spindle according to claim 1, comprising a drive transmission for transmitting a drive movement from an external drive to the differential, the drive transmission comprising a transmission shaft extending within one of the supports, from an end portion of the spindle to the differential and connected to an input of the differential.

5. Roll spindle according to claim 1, comprising a drive transmission for transmitting a drive movement from an external drive to the differential, wherein the blocking arrangement is arranged to block at least one of said roll supports from rotating with respect to the drive transmission.

6. Roll spindle according to claim 1, wherein the blocking arrangement extends near an end portion of the spindle.

7. Roll spindle according to claim 1, wherein the differential comprises a ball differential.

8. Roll spindle according to claim 1, arranged to support large format printing media rolls.

9. Large format printer, comprising a roll spindle according to claim 1.

10. Roll spindle according to claim 1, wherein the differential has one input and two outputs, the differential input connected to receive a driving torque from a drive shaft and each differential output being connected to one of the roll supports.

11. A method of processing rolls, comprising
    in a first action, mounting multiple rolls onto a spindle having multiple supports, so that each roll is supported by a respective one of the supports,
    using a differential to simultaneously drive the supports so that each support has an equal torque; and
    in a second action, removing the multiple rolls and mounting a single roll, a portion of which is supported on each of the multiple supports, and blocking one of the supports from rotation with respect to the other support.

12. The method according to claim 11, comprising sliding at least one of said rolls over the differential.

13. A method of processing rolls of a print medium in a printing system, comprising
    in a first action, mounting multiple rolls of print medium onto an elongated spindle, the spindle having multiple supports so that each roll of print medium is supported by a respective one of the supports,
    using a differential to simultaneously drive the supports so that each support has an equal torque;
    in a second action, removing the multiple rolls of print medium and mounting a single roll of print medium on the spindle, a portion of which is supported on each of the multiple supports; and
    blocking one of the supports from rotation with respect to an adjacent support of the multiple supports.

14. The method according to claim 13, comprising sliding at least one of said rolls of print medium over the differential.

* * * * *